(12) United States Patent
Sudoh (10) Patent No.: US 9,170,398 B2
(45) Date of Patent: Oct. 27, 2015

(54) IMAGING LENS SYSTEM AND IMAGING SYSTEM INCLUDING THE SAME

(71) Applicant: Yoshifumi Sudoh, Tokyo (JP)

(72) Inventor: Yoshifumi Sudoh, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 40 days.

(21) Appl. No.: 14/207,720

(22) Filed: Mar. 13, 2014

(65) Prior Publication Data

US 2014/0293457 A1 Oct. 2, 2014

(30) Foreign Application Priority Data

Mar. 29, 2013 (JP) ................................. 2013-073327

(51) Int. Cl.
  *G02B 9/08* (2006.01)
  *G02B 9/62* (2006.01)
  *G02B 9/64* (2006.01)
  *G02B 15/17* (2006.01)

(52) U.S. Cl.
  CPC .. *G02B 9/08* (2013.01); *G02B 9/62* (2013.01); *G02B 9/64* (2013.01); *G02B 15/17* (2013.01)

(58) Field of Classification Search
  CPC .............. G02B 9/08; G02B 9/12; G02B 9/34; G02B 9/60; G02B 9/62; G02B 9/64
  USPC .................. 359/745–748, 754, 755, 793, 794
  See application file for complete search history.

(56) References Cited

U.S. PATENT DOCUMENTS

| | | | |
|---|---|---|---|
| 4,200,352 A * | 4/1980 | Yuta | 359/355 |
| 7,209,300 B2 * | 4/2007 | Ryu et al. | 359/753 |
| 8,982,484 B2 * | 3/2015 | Morooka | 359/794 |
| 2007/0201144 A1 | 8/2007 | Sudoh | |
| 2007/0247726 A1 | 10/2007 | Sudoh | |
| 2008/0278779 A1 | 11/2008 | Nishina et al. | |
| 2009/0067060 A1 | 3/2009 | Sudoh | |
| 2009/0122418 A1 | 5/2009 | Atsuumi et al. | |
| 2009/0135500 A1 | 5/2009 | Sudoh et al. | |
| 2009/0147375 A1 | 6/2009 | Sudoh et al. | |
| 2009/0323200 A1 | 12/2009 | Sudoh | |
| 2010/0027136 A1 | 2/2010 | Ohashi et al. | |
| 2010/0296180 A1 | 11/2010 | Sudoh et al. | |
| 2011/0043927 A1 | 2/2011 | Sudoh | |
| 2011/0051260 A1 | 3/2011 | Nakayama et al. | |

(Continued)

FOREIGN PATENT DOCUMENTS

| | | |
|---|---|---|
| JP | 2004-212692 | 7/2004 |
| JP | 2007-025653 | 2/2007 |

(Continued)

*Primary Examiner* — Darryl J Collins
(74) *Attorney, Agent, or Firm* — Harness, Dickey & Pierce, P.L.C.

(57) ABSTRACT

An imaging lens system and an imaging system that includes the imaging lens system are provided. The imaging lens system includes an aperture stop, a first lens group with positive refractive power, and a second lens group with positive refractive power, arranged in that order from an object side to an image side. The first lens group includes a positive lens L11, and a negative meniscus lens L12 that has a convex surface on the object side. The second lens group includes a negative lens L21 that has a concave surface on the object side, a positive lens L22 and a positive lens L23 each of which has a convex surface on the image side, a negative meniscus lens L24 that has a convex surface on the object side, and a positive lens L25 that has a convex surface on the object side.

10 Claims, 6 Drawing Sheets

(56) References Cited

U.S. PATENT DOCUMENTS

| | | |
|---|---|---|
| 2011/0069402 A1 | 3/2011 | Sudoh |
| 2011/0222169 A1 | 9/2011 | Sudoh |
| 2011/0228408 A1 | 9/2011 | Sudoh |
| 2012/0127586 A1 | 5/2012 | Sudoh |

FOREIGN PATENT DOCUMENTS

| | | |
|---|---|---|
| JP | 2012-042663 | 3/2012 |
| JP | 2012-220654 | 11/2012 |
| JP | 2012-226309 | 11/2012 |

* cited by examiner

IMAGING LENS SYSTEM AND IMAGING SYSTEM INCLUDING THE SAME

CROSS-REFERENCE TO RELATED APPLICATION

This patent application is based on and claims priority pursuant to 35 U.S.C. §119 to Japanese Patent Application No. 2013-073327, filed on Mar. 29, 2013, in the Japan Patent Office, the entire disclosure of which is hereby incorporated by reference herein.

BACKGROUND

1. Technical Field

Example embodiments of the present invention generally relate to an imaging lens system and an imaging system incorporating the imaging lens system.

2. Background Art

Conventionally, imaging systems such as cameras that capture images of a subject are known.

In recent years, various types of cameras that capture images of a subject and perform image processing on the captured images are being commercialized, such as cameras that perform high-definition examination on a subject at a finite distance.

SUMMARY

Disclosed embodiments provide an imaging lens system and an imaging system that includes the imaging lens system. The imaging lens system includes an aperture stop, a first lens group with positive refractive power provided on an object side of the aperture stop, and a second lens group with positive refractive power provided on an image side of the aperture stop. The first lens group includes a positive lens L11, and a negative meniscus lens L12 that has a convex surface on the object side, arranged in that order from the object side toward the aperture stop. The second lens group includes a negative lens L21 that has a concave surface on the object side, a positive lens L22 and a positive lens L23 each of which has a convex surface on the image side, a negative meniscus lens L24 that has a convex surface on the object side, and a positive lens L25 that has a convex surface on the object side, arranged in that order from the aperture stop toward the image side. The imaging lens system shifts focus from an object at infinity to an object at a finite distance by moving the first and second lens groups together.

BRIEF DESCRIPTION OF THE DRAWINGS

A more complete appreciation of the disclosure and many of the attendant advantages and features thereof can be readily obtained and understood from the following detailed description with reference to the accompanying drawings.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Example embodiments of the present invention will be described below.

FIGS. 1-4 illustrate four example embodiments of imaging lens system according to the present invention. These Embodiments 1-4 of an imaging lens system correspond to Examples 1-4, respectively, as will be described later.

For the purpose of simplification, reference signs are used in common among FIGS. 1-4. In FIGS. 1-4, an object is on the left side, and an image of the object is formed on the right side.

The imaging lens system includes, from the object side to the image side, a first lens group I with positive refractive power, an aperture stop S, and a second lens group II with positive refractive power.

The first lens group I arranged on the object side of the aperture stop S includes a positive lens L11 and a negative meniscus lens L12 that has the convex surface on the object side, from the object side to the image side. The second lens group II includes a negative lens L21, a positive lens L22, a positive lens L23, a negative meniscus lens L24, and a positive lens L25, from the object side to the image side.

The negative lens L21 has the concave surface on the object side. The positive lens L22 and the positive lens L23 have the convex surface on the image side. The negative meniscus lens L24 has the convex surface on the object side. The positive lens L25 has the convex surface on the object side.

Note that L11, L12, and L21 to L25 are parts of the name of lens that indicate corresponding lenses. For example, the positive lens L11 is the name that indicates the first lens of the first lens group I from the object side. In a similar manner, the positive lens L23 is the name that indicates the third lens of the second lens group II from the object side.

However, L11, L12, and L21 to L25 are also used as reference signs in FIGS. 1-4.

In FIGS. 1-4, the reference sign "F" on the image side of the imaging lens system indicates a transparent parallel plate.

The transparent parallel plate F is assumed to be various filters such as an optical low pass filter and an infrared cut-off filter, or a cover glass (seal glass) of a light receiving element such as a CCD (charge-coupled device) sensor.

In other words, such various filters or cover glass are shown as the optically equivalent transparent parallel plate F.

The present invention is aimed at achieving an imaging lens system that is fast and compact, and favorably corrects various aberrations such as distortion. Generally, it becomes more difficult for a fast imaging lens to correct spherical aberration or coma aberration as the aperture becomes larger.

According to the embodiments of the present invention, the positive lens L11, the negative meniscus lens L12, the negative lens L21, the positive lens L22, and the positive lens L23 mainly correct spherical aberrations and coma aberrations.

Moreover, the negative meniscus lens L24 and the positive lens L25 are arranged next to the positive lens L23 to favorably correct distortion, and the telecentricity of the imaging lens system on the image side is also achieved.

In Examples 1-4, as will be described later, the distortion is reduced to equal to or less than 1%.

Because the imaging lens system according to an embodiment of the present invention shifts focus from an object at infinity to an object at a finite distance by moving all lens groups together as a whole (this type of focusing is referred to as, for example, unit focusing, all-group focusing, and overall linear extension), it is necessary to achieve telecentricity on the image side. These lenses are moved by using a micromotor.

Also in the imaging lens system of Examples 1-4 that correspond to Embodiments 1-4, as will be described later, telecentricity on the image side is sufficiently achieved.

Because focusing is performed by moving all lens groups of the imaging lens system together, the spacing among all the seven lenses of the first and second lens groups is fixed.

Accordingly, the negative meniscus lens L24 and the positive lens L25 may be used to correct distortion and achieve telecentricity on the image side.

In Embodiments 1-4 illustrated in FIGS. 1-4, the negative lens L21 and the positive lens L22 of the second lens group II are joined to each other.

In the set of imaging lens system according to the embodiments of the present invention, the lens surface of the negative lens L21 on the object side and the lens surface of the positive lens L22 on the image side play an important role in correcting spherical aberrations and coma aberrations.

Accordingly, it becomes possible to sufficiently correct spherical aberration due to production error by appropriately aligning the negative lens L21 and the positive lens L22.

In other words, the decentering of the negative lens L21 and the positive lens L22 greatly affects the performance because these lenses play an important role in correcting spherical aberrations and coma aberrations as described above.

When the negative lens L21 and the positive lens L22 are joined to each other, decentering of the lens surface of the negative lens L21 on the object side and the lens surface of the positive lens L22 on the image side can be minimized.

As described above, preferably the negative lens L21 and the positive lens L22 are joined to each other in the second lens group II.

In addition to the configuration described above, preferably the imaging lens system according to Examples 1-4 of the present invention satisfies at least one of conditions (1)-(8) below.

$$0.25 < Da/D2 < 0.45 \quad (1)$$

$$-0.35 < (R211-R222)/(R211+R222) < -0.15 \quad (2)$$

$$-0.7 < f21/f < 0.4 \quad (3)$$

$$0.7 < f22/f < 1.0 \quad (4)$$

$$1.0 < (R231-R232)/(R231+R232) < 3.0 \quad (5)$$

$$1.3 < f23/f < 1.7 \quad (6)$$

$$-2.5 < f24/f < 1.5 \quad (7)$$

$$0.9 < f25/f < 1.4 \quad (8)$$

"Da" indicates the space on the optical axis of the lenses of the second lens group between the lens surface of the negative lens L21 on the image side and the lens surface of the positive lens L22 on the object side. "D2" indicates distance on the optical axis of the lenses of the second lens group between the lens surface of the negative lens L21 on the object side and the lens surface of the positive lens L25 on the image side.

"R211" indicates the radius of curvature of the lens surface of the negative lens L21 on the object side, and "R222" indicates the radius of curvature of the lens surface of the positive lens L22 on the image side.

As described above, these two surfaces play an important role in correcting spherical aberrations and coma aberrations.

"f21" indicates the focal length of the negative lens L21, and "f22" indicates the focal length of the positive lens L22. "f" indicates the focal length of the entire optical system.

"R231" indicates the radius of curvature of the lens surface of the positive lens L23 on the object side, and "R232" indicates the radius of curvature of the lens surface of the positive lens L23 on the image side.

"f23" indicates the focal length of the negative lens L23 of the second lens group.

"f24" indicates the focal length of the negative lens L24, and "f25" indicates the focal length of the positive lens L25.

Condition (1) is to be met in order to achieve compatibility between downsizing and high performance of the imaging lens system.

When "Da" exceeds the upper limit, the space between the lens surface of the negative lens L21 on the object side and the lens surface of the positive lens L22 on the image side becomes excessively large. In that case, flexibility in the arrangement of the positive lens L23, the negative lens L24, and the positive lens L25 suffers when the imaging lens system are to be downsized. Moreover, it tends to be difficult to sufficiently correct overall monochromatic aberration.

When "Da" falls below the lower limit, the space between the lens surface of the negative lens L21 on the object side and the lens surface of the positive lens L22 on the image side becomes too small, and it tends to be difficult to sufficiently correct spherical aberrations and coma aberrations.

Preferably, the parameter "Da/D2" of condition (1) satisfies the following condition.

$$0.30 < Da/D2 < 0.40 \quad (1A)$$

Condition (2) is to be met in order to correct spherical aberrations and coma aberrations efficiently.

When condition (2) is not met, it tends to be difficult to keep balance for correcting spherical aberrations and coma aberrations between the lens surface of the negative lens L21 on the object side and the lens surface of the positive lens L22 on the image side. Accordingly, it tends to be difficult to efficiently correct spherical aberrations and coma aberrations.

When conditions (3) and (4) are met, the distribution of power becomes well balanced between the negative lens L21 and the positive lens L22, and these lenses can efficiently correct spherical aberrations and coma aberrations.

Condition (5) indicates a range where the refractive power of both sides of the positive lens L23 is appropriate.

When condition (5) is met, the task of aberration correction can be well distributed between the lens surfaces of the positive lens L23 on the object side and image side, and it becomes easy for the imaging lens system as a whole to sufficiently correct monochromatic aberration.

Preferably, the parameter "(R231−R232)/(R231+R232)" of condition (5) satisfies the following condition.

$$1.5<(R231-R232)/(R231+R232)<2.5 \quad (5A)$$

Condition (6) indicates an appropriate range of the power of the negative lens L23.

When "f23/f" exceeds the upper limit, the focal length of the positive lens L23 becomes too large, and it becomes necessary to reduce the focal length of the positive lens L22 to compensate for the focal length of the positive lens L23, in order to achieve a compact size. Accordingly, when "f23/f" exceeds the upper limit, it tends to be difficult to efficiently correct spherical aberrations and coma aberrations.

When "f23/f" falls below the lower limit, the focal length of the positive lens L23 becomes too small, and the aberration at the positive lens L23 tends to be large. Accordingly, when "f23/f" falls below the lower limit, it tends to be difficult for the imaging lens system as a whole to correct monochromatic aberration. Moreover, the influence of de-centering of the positive lens L23 becomes large, and manufacturing becomes difficult.

Preferably, the parameter "f23/h" of condition (6) satisfies the following condition.

$$1.3<f23/f<1.7 \quad (6A)$$

Conditions (7) and (8) enable better correction of distortion, and also make it easy to achieve telecentricity on the image side. As described above, the negative meniscus lens L24 and the positive lens L25 of the imaging lens system according to the embodiments of the present invention correct distortion and achieve telecentricity on the image side. When conditions (7) and (8) are met, it becomes easy for the negative meniscus lens L24 and the positive lens L25 to correct distortion and achieve telecentricity on the image side.

Before describing specific examples of an imaging lens system, an embodiment of an imaging system (hereinafter, referred to as a camera) is described with reference to FIGS. 9A and 9B and FIG. 10.

A camera is provided with an imaging lens system according to the embodiments of the present invention, which serves as the imaging optical system of the camera.

Figure 9A:
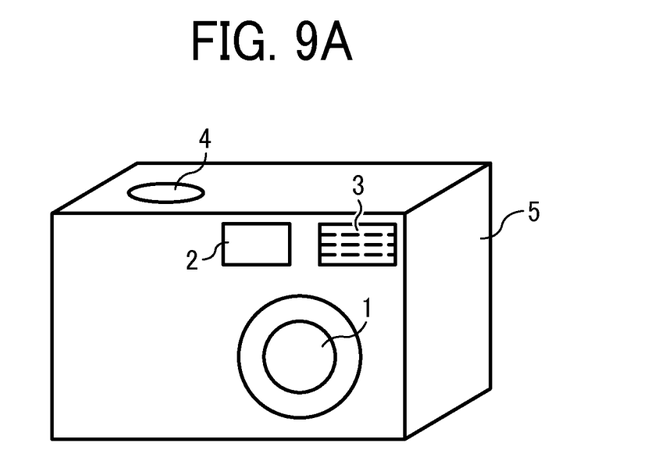
FIGS. 9A and 9B are front and rear views of an imaging system according to an embodiment of the present invention.
Figure 9B:
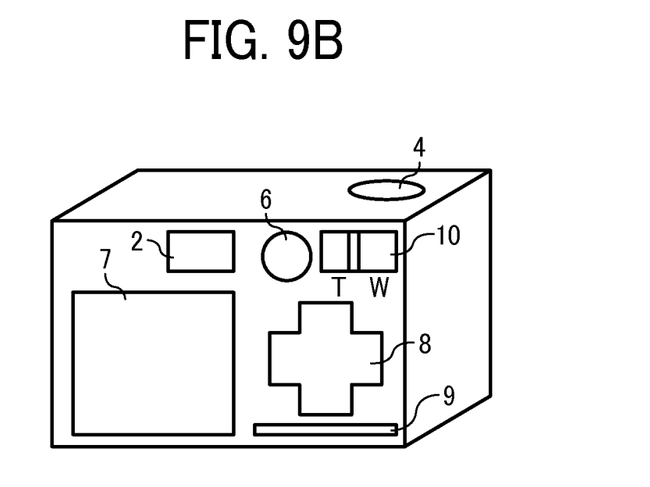
Figure 10:
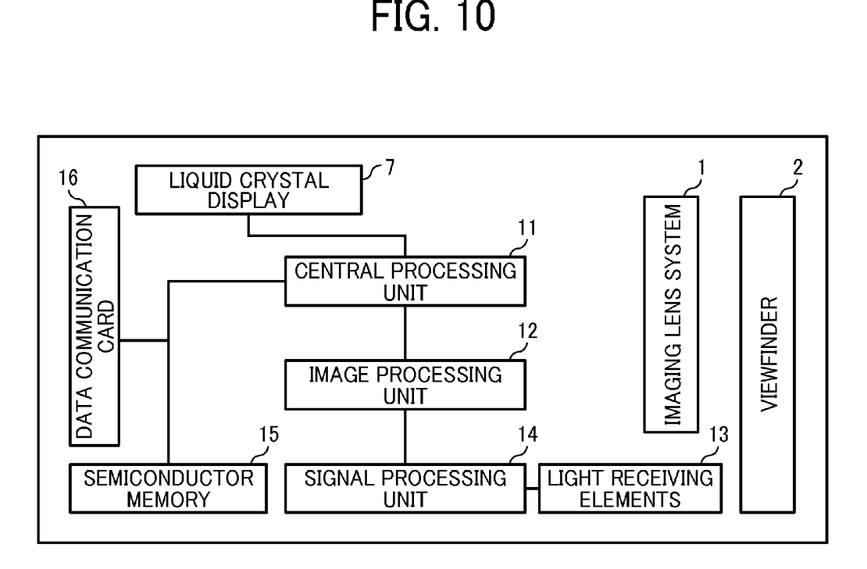
FIG. 10 is a block diagram illustrating an example system configuration of an imaging system, according to an embodiment of the present invention.

As illustrated in FIGS. 9 and 10, the camera includes an imaging lens system 1, a viewfinder 2, a flash light 3, a shutter button 4, a camera body 5, a power switch 6, a liquid crystal display 7, an operation button 8, a memory card slot 9, a zoom switch 10, and light receiving elements (area sensor) 13 that are solid-state image sensing elements. The light receiving elements 13 receive the image of a target to be captured by the imaging lens system 1. Any of the imaging lens system according to Examples 1-4, as will be described later, may be used as a part of the imaging lens system 1.

The signal output from the light receiving elements 13 is processed by a signal processing unit 14 that is controlled by a central processing unit (CPU) 11, and is converted into digital data. The image data digitalized by the signal processing unit 14 is subjected to specified image processing performed by an image processing unit 12, which is controlled by the CPU 11. The image data that has gone through the image processing is stored in a semiconductor memory 15.

The liquid crystal display 7 may display an image that is being captured, or display an image stored in the semiconductor memory 15. As the liquid crystal display 7 can display image that is being captured, the viewfinder 2 may be omitted.

An image stored in the semiconductor memory 15 may be transferred to another device by using a data communication card 16 or the like.

When the camera is carried, that is, when not in use, the barrel of the imaging lens system 1 is collapsed as illustrated in FIG. 9A. When the power switch 6 is operated and the power is turned on, the barrel extends externally. When extended, the imaging lens system 1 focuses on an object at infinity.

Focusing is performed when the shutter button 4 is partially depressed. The imaging lens system 1 focus on an object at short distance by moving all lens groups together as a whole towards the object. When the shutter button 4 is fully depressed, the image processing is performed as described above.

When an image stored in the semiconductor memory 15 is to be displayed on the liquid crystal display 7 or transferred to an another device by using the data communication card 16 or the like, the operation button 8 is used. When the imaging lens system 1 is collapsed, it is not always necessary for all of the imaging lens system 1 to be in line with the optical axis. For example, when the lenses of the first lens group I shift away from the optical axis and are stored in parallel with the lenses of the second lens group II, further sliming down of the camera can be achieved.

The communication unit of the camera as described above may be removed to configure an independent camera. Any of the imaging lens systems according to Examples 1-4, as will be described later, may be used for the camera.

A small, high-resolution camera provided with 2 to 5 million pixel solid-state image sensing elements or a portable information terminal may be used, either independently or as part of a larger camera.

EXAMPLES

Four specific examples of imaging lens systems are described below. Unless otherwise specified, the measurement unit of length is mm in the specific data of Examples 1-4. In Examples 1-4, the largest height of an image is 5.50 mm. The data in Examples 1-4 indicates values when an object at infinity is focused. All the imaging lens systems in Examples 1-4 are configured to perform optimally when all lens groups are moved together as a whole to focus on an object 300 mm from the imaging plane.

Accordingly, the aberration curves of the imaging lens system indicate the performance when the imaging lens system focuses on an object 300 mm from the imaging plane.

The reference signs in Examples 1-4 are explained below.
f: Focal length of entire optical system
F: F number ω: Half angle of view
R: Radius of curvature
D: Surface spacing
$N_d$: Reflective index
$v_d$: Abbe number Example 1

Figure 1:
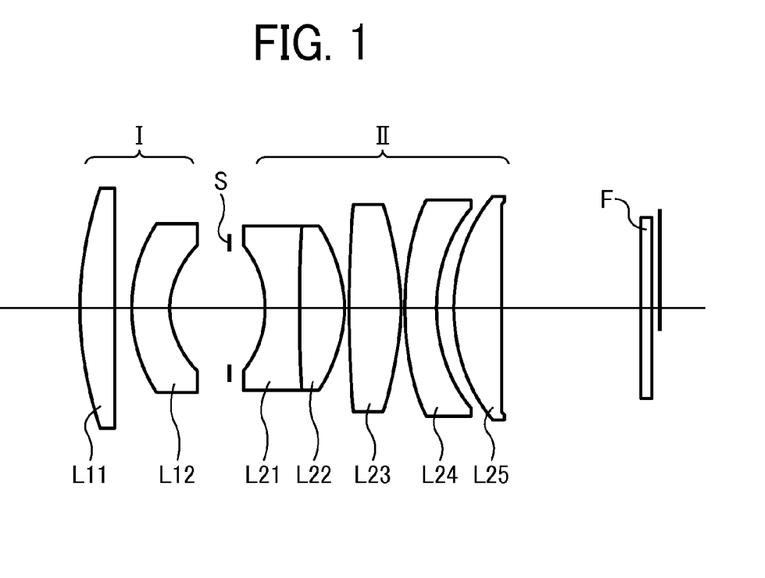
FIG. 1 illustrates the configuration of an imaging lens system according to Embodiment 1 of the present invention.

Example 1 is a concrete example of the imaging lens system whose structure is illustrated in FIG. 1. Note that f=16.0, F=1.43, and ω=18.9 degree. The data of the imaging lens system of Example 1 is depicted in Table 1 below.

TABLE 1

|   | R       | D    | N       | v     | GLASS         |
|---|---------|------|---------|-------|---------------|
| 1 | 25.014  | 2.59 | 1.72000 | 49.34 | S-LAM60(OHARA) |
| 2 | 1516.014 | 1.36 |         |       |               |
| 3 | 11.087  | 2.94 | 1.48749 | 70.24 | S-FSL5 (OHARA) |
| 4 | 6.195   | 1.91 |         |       |               |
| 5 | 0.000   | 2.68 |         |       |               |
| 6 | 0.000   | 2.77 |         |       |               |
| 7 | -6.691  | 2.63 | 1.78472 | 26.52 | S-TIH14 (OHARA) |
| 8 | 178.065 | 3.44 | 1.71300 | 53.87 | S-LAL8 (OHARA) |
| 9 | -10.153 | 0.30 |         |       |               |
| 10 | 61.996 | 4.00 | 1.76200 | 40.93 | S-LAH53(OHARA) |
| 11 | -22.464 | 0.30 |         |       |               |
| 12 | 19.720 | 2.54 | 1.84666 | 23.78 | S-TIH53(OHARA) |
| 13 | 11.311 | 1.45 |         |       |               |
| 14 | 13.225 | 3.61 | 1.71300 | 53.87 | S-LAL8(OHARA) |
| 15 | 425.902 | 9.74 |         |       |               |
| 16 | 0.000  | 0.75 | 1.51633 | 64.10 | FILTER, etc.  |
| 17 | 0.000  |      |         |       |               |

Values of Parameters in Conditions (1)-(8)

The values of the parameters in conditions (1)-(8) are depicted in Table 2 below.

TABLE 2

| Da/D2 | 0.33 |
|---|---|
| (R211 − R222)/(R211 + R222) | −0.21 |
| f21/f | −0.51 |
| f22/f | 0.85 |
| (R231 − R232)/(R231 + R232) | 2.14 |
| f23/f | 1.38 |
| f24/f | −2.27 |
| f25/f | 1.19 |

Example 2

Figure 2:
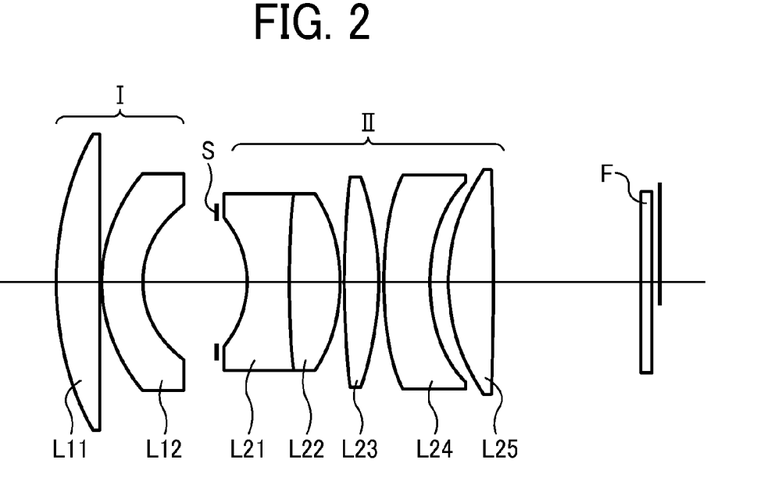
FIG. 2 illustrates the configuration of an imaging lens system according to Embodiment 2 of the present invention.

Example 2 is a concrete example of the imaging lens system whose structure is illustrated in FIG. 2. Note that f=16.0, F=1.42, and ω=18.8 degree. The data of the imaging lens system of Example 2 is depicted in Table 3 below.

TABLE 3

|   | R       | D    | N       | v     | GLASS         |
|---|---------|------|---------|-------|---------------|
| 1 | 22.067  | 3.09 | 1.71299 | 53.87 | S-LAL8(OHARA) |
| 2 | 608.813 | 0.30 |         |       |               |
| 3 | 11.324  | 2.90 | 1.48749 | 70.24 | S-FSL5 (OHARA) |
| 4 | 6.283   | 3.49 |         |       |               |
| 5 | 0.000   | 1.87 |         |       |               |
| 6 | 0.000   | 2.13 |         |       |               |
| 7 | -7.012  | 2.99 | 1.72825 | 28.46 | S-TIH10 (OHARA) |
| 8 | 39.275  | 3.82 | 1.71299 | 53.87 | S-LAL8 (OHARA) |
| 9 | -11.486 | 0.30 |         |       |               |
| 10 | 69.755 | 2.43 | 1.80610 | 40.93 | S-LAH53(OHARA) |
| 11 | -22.568 | 0.30 |         |       |               |
| 12 | 21.372 | 3.44 | 1.84666 | 23.78 | S-TIH53(OHARA) |
| 13 | 11.212 | 1.30 |         |       |               |
| 14 | 13.240 | 3.29 | 1.71299 | 53.87 | S-LAL8(OHARA) |
| 15 | -239.367 | 9.73 |       |       |               |
| 16 | 0.000  | 0.75 | 1.51633 | 64.10 | FILTER, etc.  |
| 17 | 0.000  |      |         |       |               |

Values of Parameters in Conditions (1)-(8)

The values of the parameters in conditions (1)-(8) are depicted in Table 4 below.

TABLE 4

| Da/D2 | 0.38 |
|---|---|
| (R211 − R222)/(R211 + R222) | −0.24 |
| f21/f | −0.50 |
| f22/f | 0.80 |
| (R231 − R232)/(R231 + R232) | 1.96 |
| f23/f | 1.34 |
| f24/f | −2.06 |
| f25/f | 1.11 |

Example 3

Figure 3:
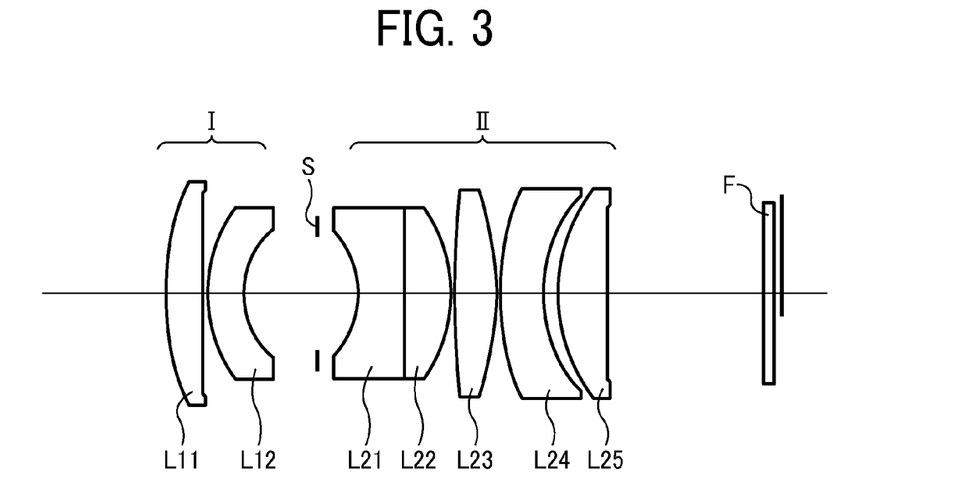
FIG. 3 illustrates the configuration of an imaging lens system according to Embodiment 3 of the present invention.

Example 3 is a concrete example of the imaging lens system whose structure is illustrated in FIG. 3. Note that f=16.0, F=1.43, and ω=18.9 degree. The data of the imaging lens system of Example 3 is depicted in Table 5 below.

TABLE 5

|   | R       | D    | N       | v     | GLASS         |
|---|---------|------|---------|-------|---------------|
| 1 | 21.675  | 2.47 | 1.77250 | 49.60 | S-LAH66(OHARA) |
| 2 | 235.573 | 0.30 |         |       |               |
| 3 | 10.694  | 2.49 | 1.51742 | 52.43 | S-NSL36(OHARA) |
| 4 | 6.350   | 5.12 |         |       |               |
| 5 | 0.000   | 2.77 |         |       |               |
| 6 | -6.946  | 3.20 | 1.80518 | 25.42 | S-TIH6(OHARA) |
| 7 | 509.112 | 3.25 | 1.77250 | 49.60 | S-LAH66(OHARA) |
| 8 | -10.808 | 0.30 |         |       |               |
| 9 | 80.386  | 2.70 | 1.83400 | 37.16 | S-LAH60(OHARA) |
| 10 | -23.263 | 0.30 |       |       |               |
| 11 | 20.921 | 3.00 | 1.84666 | 23.78 | S-TIH53(OHARA) |
| 12 | 11.085 | 0.99 |         |       |               |
| 13 | 12.510 | 3.45 | 1.71300 | 53.87 | S-LAL8(OHARA) |
| 14 | 224.930 | 9.75 |       |       |               |
| 15 | 0.000  | 0.75 | 1.51633 | 64.10 | FILTER, etc.  |
| 16 | 0.000  |      |         |       |               |

Values of Parameters in Conditions (1)-(8)

The values of the parameters in conditions (1)-(8) are depicted in Table 6 below.

TABLE 6

| Da/D2 | 0.38 |
|---|---|
| (R211 − R222)/(R211 + R222) | −0.22 |

TABLE 6-continued

| | |
|---|---|
| f21/f | −0.53 |
| f22/f | 0.86 |
| (R231 − R232)/(R231 + R232) | 1.81 |
| f23/f | 1.37 |
| f24/f | −2.02 |
| f25/f | 1.15 |

Example 4

Figure 4:
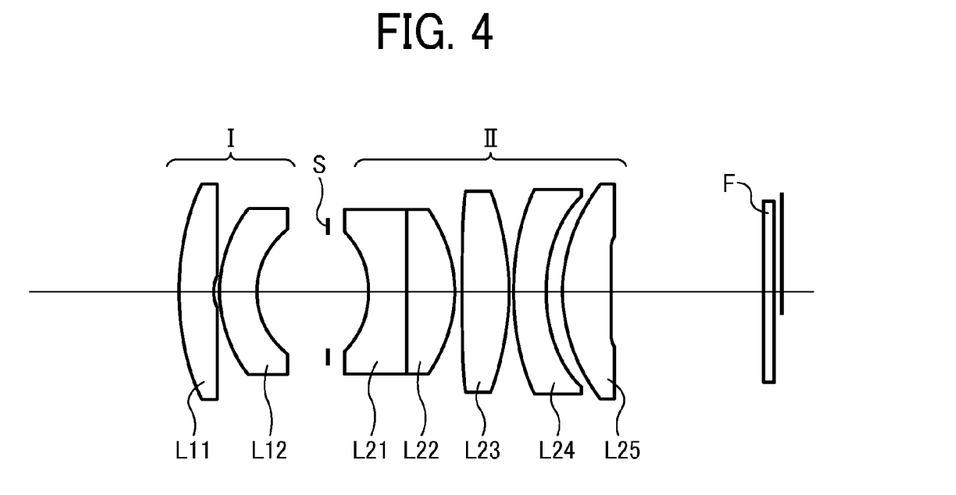
FIG. 4 illustrates the configuration of an imaging lens system according to Embodiment 4 of the present invention.
Figure 5:
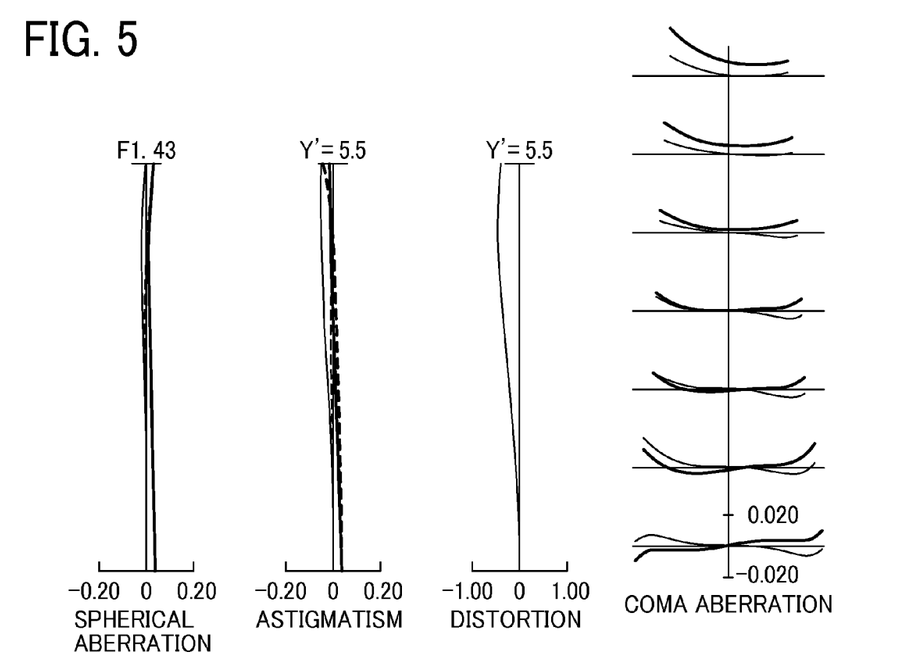
FIG. 5 illustrates the aberration curves of an imaging lens system according to Example 1 of the present invention that corresponds to Embodiment 1.
Figure 6:
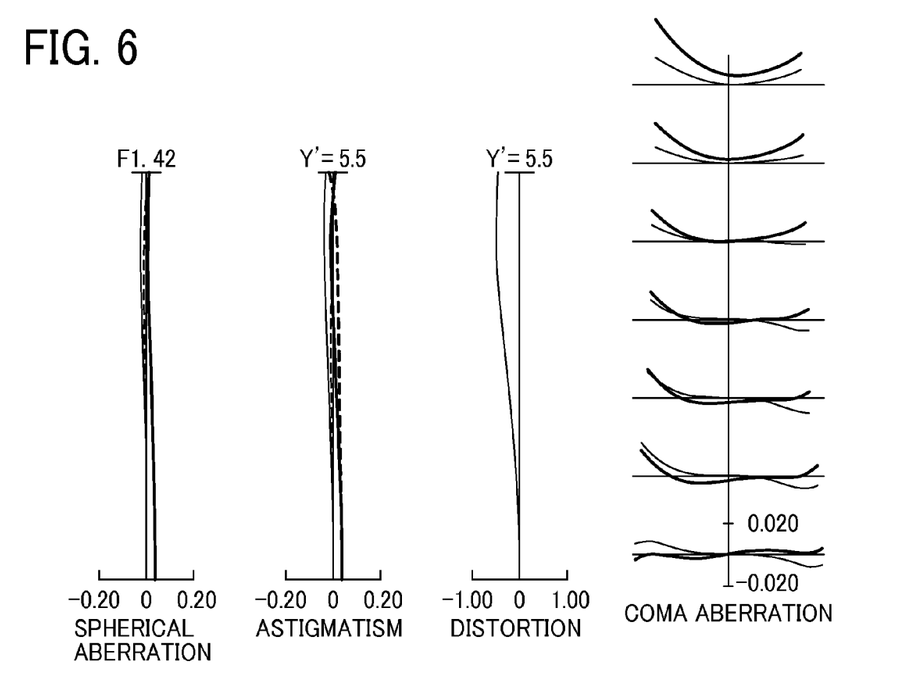
FIG. 6 illustrates the aberration curves of an imaging lens system according to Example 2 of the present invention that corresponds to Embodiment 2.
Figure 7:
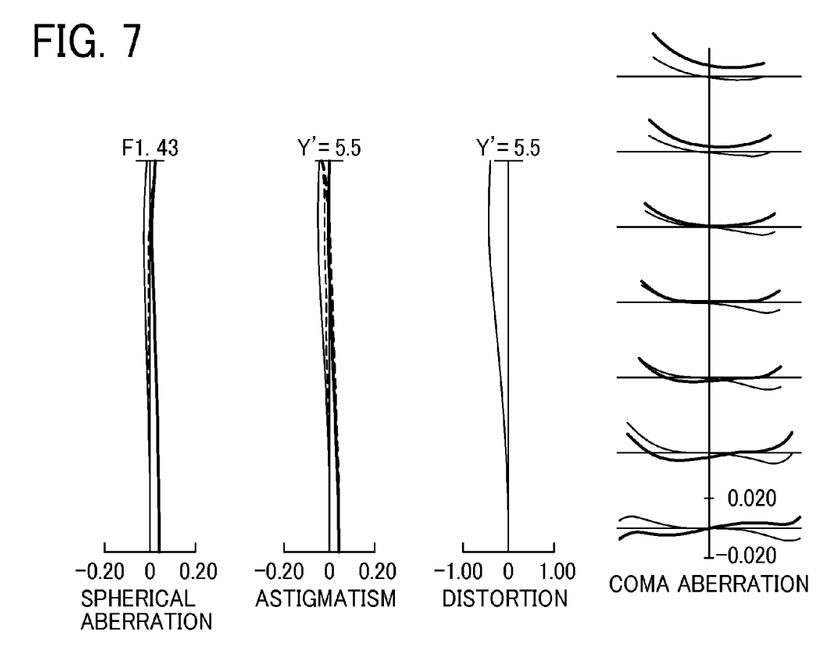
FIG. 7 illustrates the aberration curves of an imaging lens system according to Example 3 of the present invention that corresponds to Embodiment 3.
Figure 8:
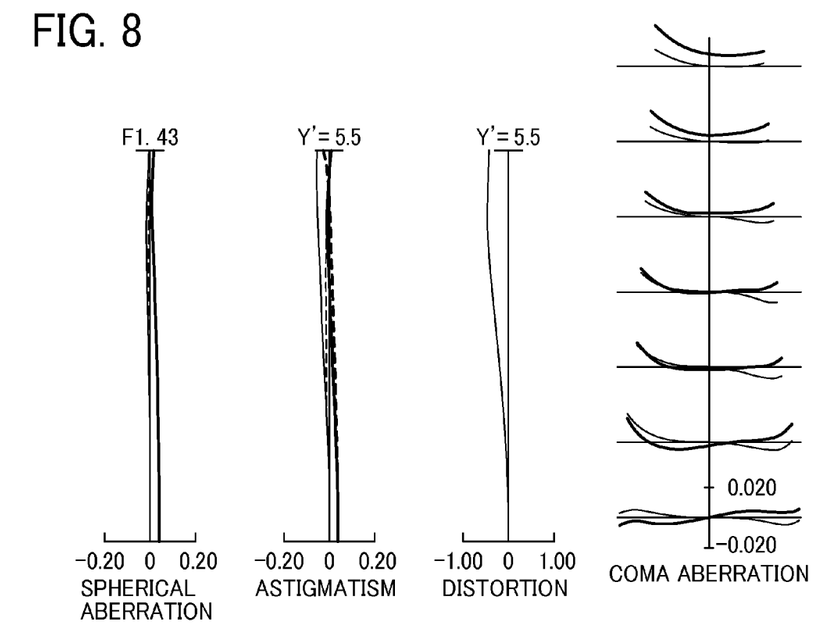
FIG. 8 illustrates the aberration curves of an imaging lens system according to Example 4 of the present invention that corresponds to Embodiment 4.

Example 4 is a concrete example of the imaging lens system whose structure is illustrated in FIG. 4. Note that f=16.0, F=1.43, and ω=18.9 degree. The data of the imaging lens system of Example 4 is depicted in Table 7 below.

TABLE 7

| | R | D | N | ν | GLASS |
|---|---|---|---|---|---|
| 1 | 20.328 | 2.58 | 1.74320 | 49.34 | S-LAM60(OHARA) |
| 2 | 212.100 | 0.30 | | | |
| 3 | 10.726 | 2.62 | 1.54814 | 45.78 | S-TIL1 (OHARA) |
| 4 | 6.150 | 2.00 | | | |
| 5 | 0.000 | 3.05 | | | |
| 6 | 0.000 | 2.77 | | | |
| 7 | −6.813 | 2.63 | 1.74077 | 27.79 | S-TIH13 (OHARA) |
| 8 | −1775.627 | 3.50 | 1.77250 | 49.60 | S-LAH66 (OHARA) |
| 9 | −10.583 | 0.30 | | | |
| 10 | 77.633 | 3.45 | 1.77250 | 49.60 | S-LAH66(OHARA) |
| 11 | −22.816 | 0.30 | | | |
| 12 | 20.494 | 2.25 | 1.84666 | 23.78 | S-TIH53(OHARA) |
| 13 | 11.304 | 1.27 | | | |
| 14 | 13.022 | 3.53 | 1.74320 | 49.34 | S-LAM60(OHARA) |
| 15 | 200.520 | 9.74 | | | |
| 16 | 0.000 | 0.75 | 1.51633 | 64.10 | FILTER, etc. |
| 17 | 0.000 | | | | |

Values of Parameters in Conditions (1)-(8)

The values of the parameters in conditions (1)-(8) are depicted in Table 8 below.

TABLE 8

| | |
|---|---|
| Da/D2 | 0.36 |
| (R211 − R222)/(R211 + R222) | −0.22 |
| f21/f | −0.58 |
| f22/f | 0.86 |
| (R231 − R232)/(R231 + R232) | 1.83 |
| f23/f | 1.45 |
| f24/f | −2.10 |
| f25/f | 1.16 |

As described above, the data shown with respect to Examples 1-4 indicates values when an object at infinity is focused.

The imaging lens system shifts focus from an object at infinity to an object at a finite distance (300 mm from the imaging plane) by moving the imaging lens system as a whole toward the object. Accordingly, the space varies between the surface 15 and the surface 16 that is the surface of a filter F on the object side.

The amounts of extension (space between surfaces) in Examples 1-4 are shown below.

| Distance from object | Infinity | 300 mm from imaging plane |
|---|---|---|
| Example 1 | 9.740 | 10.700 |
| Example 2 | 9.728 | 10.689 |
| Example 3 | 9.750 | 10.174 |
| Example 4 | 9.741 | 10.703 |

The aberration curves of the imaging lens system according to Examples 1-4 are illustrated in FIGS. 5-8, respectively.

In the aberration curves in FIGS. 5-8, the broken lines in spherical aberration indicate the spherical aberration to sine condition, and the solid lines and broken lines in astigmatism indicate the astigmatism on the sagittal and meridional planes, respectively. The fine lines and bold lines indicate aberration curves with reference to d-line and g-line, respectively.

As illustrated in FIGS. 5-8, aberrations are corrected at a high level in the examples, and spherical aberrations and axial chromatic aberrations are so small that they do not cause a problem and can be ignored.

Astigmatism, curvature of field, and lateral chromatic aberration are also sufficiently small, and coma aberration and variance in the color difference are well controlled to the very end.

The distortion is very well controlled to the order of 0.5% in the absolute value.

Color difference or the like is also sufficiently reduced, and resolution that corresponds to light receiving elements of 2 to 5 million pixels is achieved.

Telecentricity on the image side is sufficiently achieved. Accordingly, the angle of incidence to light receiving elements is small, and a high-contrast image is achieved from the opening of a stop and dot images are not degraded even on the periphery of the angle of view.

Moreover, straight lines can be drawn as straight lines with no deformation.

As is apparent from Examples 1-4 that very preferable imaging performance can be achieved by the imaging lens system according to at least one embodiment of the present invention even though the half angle of view is 20 degree and the diameter is large as f-number is 1.4 or so.

Note that the imaging lens system according to at least one embodiment of the present invention may be provided for various kinds of cameras as a set of interchangeable lenses. In addition, the imaging lens system according to Examples 1-4 is particularly suitable for capturing images at short distances.

The imaging lens system according to at least one embodiment of the present invention includes the first and second lens groups, which include two lenses and five lenses, respectively. In other words, the entire optical system consists of seven lenses, which is compact. However, the number of lenses may not be limited to seven.

Moreover, focusing is performed by moving all lens groups together as a whole, and thus the focusing mechanism is simple.

Due to the lens configuration and the focusing mechanism where all lens groups are moved together as a whole, it becomes possible to sufficiently correct aberrations such as distortion.

Numerous additional modifications and variations are possible in light of the above teachings. It is therefore to be understood that within the scope of the appended claims, the disclosure of the present invention may be practiced otherwise than as specifically described therein. For example, elements and/or features of different illustrative embodiments may be combined with each other and/or substituted for each other within the scope of this disclosure and appended claims.

In the above-described referring to FIGS. 9A, 9B, and 10, it is assumed that the imaging system is implemented by a camera having any one of the above-described imaging lenses. Alternatively, any one of the above-described imaging lenses may be incorporated in any desired imaging system other than the camera, such as a personal digital assistant (PDA) device having the function of camera including, for example, a portable phone.

What is claimed is:

1. An imaging lens system comprising:
an aperture stop;
a first lens group with positive refractive power provided on an object side of the aperture stop, the first lens group including a positive lens L11, and a negative meniscus lens L12 that has a convex surface on the object side, arranged in that order from the object side toward the aperture stop; and
a second lens group with positive refractive power provided on an image side of the aperture stop, the second lens group including a negative lens L21 that has a concave surface on the object side, a positive lens L22 and a positive lens L23 each of which has a convex surface on the image side, a negative meniscus lens L24 that has a convex surface on the object side, and a positive lens L25 that has a convex surface on the object side, arranged in that order from the aperture stop toward the image side,
wherein the imaging lens system shifts focus from an object at infinity to an object at a finite distance by moving the first and second lens groups together.

2. The imaging lens system according to claim 1, wherein the negative lens L21 and the positive lens L22 of the second lens group are joined to each other.

3. The imaging lens system according to claim 1, wherein $$0.25 < Da/D2 < 0.45,$$

where Da indicates space on an optical axis of the second lens group between the lens surface of the negative lens L21 on the image side and the lens surface of the positive lens L22 on the object side, and
D2 indicates space on the optical axis of the second lens group between the lens surface of the negative lens L21 on the object side and the lens surface of the positive lens L25 on the image side.

4. The imaging lens system according to claim 1, wherein $$-0.35 < (R211 - R222)/(R211 + R222) < -0.15,$$

where R211 indicates a radius of curvature of the lens surface of the negative lens L21 of the second lens group on the object side, and
R222 indicates a radius of curvature of the lens surface of the positive lens L22 of the second lens group on the image side.

5. The imaging lens system according to claim 1, wherein $$-0.7 < f21/f < 0.4 \text{ and } 0.7 < f22/f < 1.0,$$

where f21 indicates focal length of the negative lens L21 of the second lens group,
f22 indicates focal length of the positive lens L22 of the second lens group, and
f indicates overall focal length of the imaging lens system.

6. The imaging lens system according to claim 1, wherein $$1.0 < (R231 - R232)/(R231 + R232) < 3.0,$$

where R231 indicates a radius of curvature of the lens surface of the positive lens L23 of the second lens group on the object side, and
R232 indicates a radius of curvature of the lens surface of the positive lens L23 of the second lens group on the image side.

7. The imaging lens system according to claim 1, wherein $$1.3 < f23/R1.7,$$

where f23 indicates focal length of the negative lens L23 of the second lens group, and
f indicates overall focal length.

8. The imaging lens system according to claim 1, wherein $$-2.5 < f24/f < 1.5 \text{ and } 0.9 < f25/f < 1.4,$$

where f24 indicates focal length of the negative lens L24 of the second lens group,
f25 indicates focal length of the positive lens L25 of the second lens group, and
f indicates overall focal length.

9. An imaging system comprising the imaging lens system according to claim 1.

10. The imaging system of claim 9, wherein the imaging system is a camera.

* * * * *